March 4, 1924.  
E. W. WEBB  
ROLLER SIDE BEARING  
Filed Nov. 22, 1920

INVENTOR.  
EDWIN W. WEBB.  
BY HIS ATTORNEY.  
James F. Williamson

March 4, 1924.

E. W. WEBB 1,485,575

ROLLER SIDE BEARING

Filed Nov. 22, 1920

INVENTOR.
EDWIN W. WEBB.

BY HIS ATTORNEY
James F. Williamson

Patented Mar. 4, 1924.

1,485,575

UNITED STATES PATENT OFFICE.

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY.

ROLLER SIDE BEARING.

Application filed November 22, 1920. Serial No. 425,647.

*To all whom it may concern:*

Be it known that I, EDWIN W. WEBB, a citizen of the United States, residing at Chicago, in the county of Cook and State of Illinois, have invented certain new and useful Improvements in Roller Side Bearings; and I do hereby declare the following to be a full, clear, and exact description of the invention, such as will enable others skilled in the art to which it appertains to make and use the same.

This invention relates to a roller bearing, and particularly to a side bearing for railway cars, which bearing is adapted to be supported upon and carried by the truck bolster, the roller member thereof adapted to bear upon the wearing surface provided on the body bolster of the car.

It is an object of this invention to provide such a bearing having a counterweight means which tends to automatically maintain the bearing roller in its central and normal position.

It is a further object of the invention to so arrange the parts that the counterweight members will be disposed closely adjacent to the frame or housing member of the bearing, so that a neat and compact structure is produced.

These and other objects and advantages of the invention will become apparent as the description proceeds in connection with the accompanying drawings in which like reference characters refer to the same parts throughout the different views, and in which—

Figure 1:
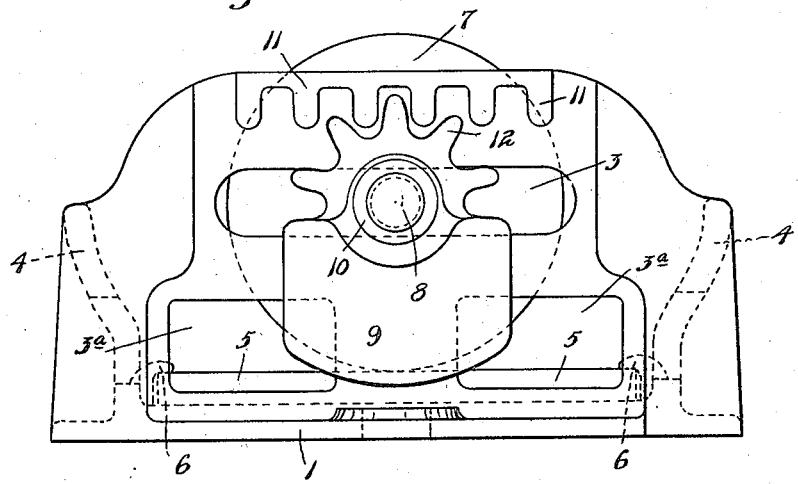
Fig. 1 is a view in side elevation of the bearing.
Figure 2:
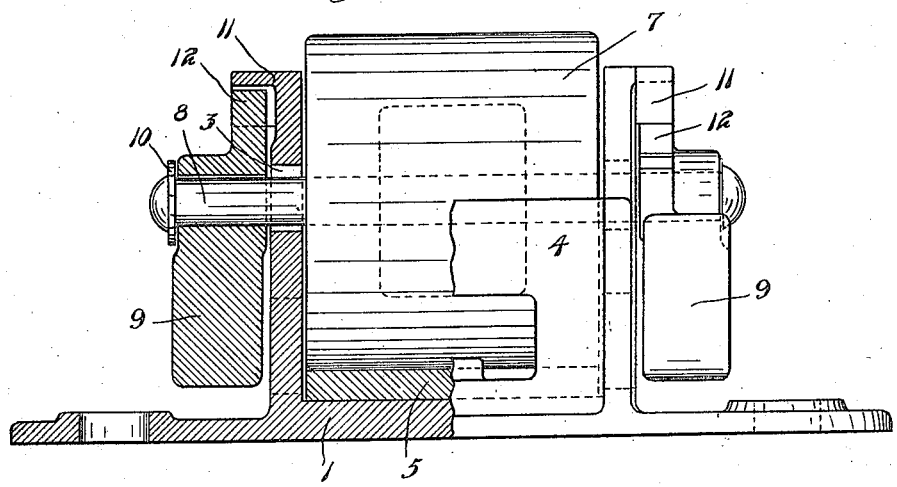
Fig. 2 is a view in end elevation of the bearing, a part thereof being shown in section.
Figure 3:
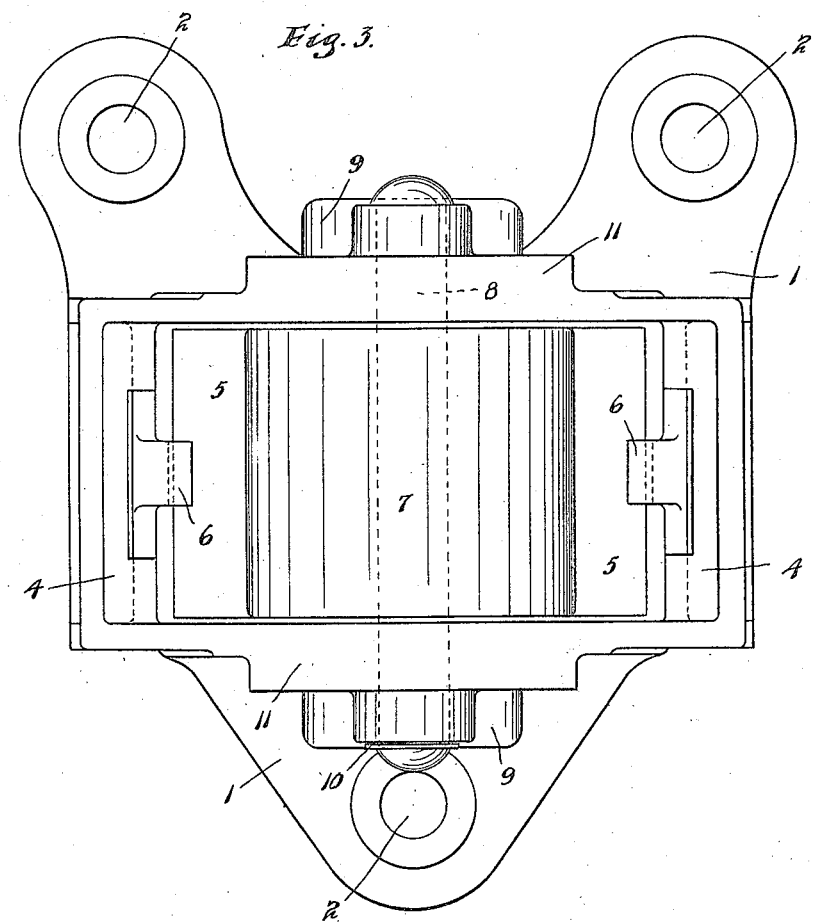
Fig. 3 is a top plan view of the bearing.

Referring to the drawings, the structure is seen to comprise a frame member having a base portion 1 from which extend lugs having finishing bosses provided thereon, through which are formed the holes 2 which are adapted to receive bolts or screws for securing the bearing in position. Three of such lugs are shown, one of which is centrally disposed at one side of the member 1, preferably the outer side of the bearing, the other two diverging from the ends of member 1 at the inner side of the bearing. A substantially rectangular housing member has its side and end walls rising from the member 1, the side walls thereof being of greater height than the end walls and being formed with curves at their end portions to suitably converge with the end walls to present a pleasing appearance. The wide walls of the housing are provided with horizontally disposed elongated slots or openings 3 and spaced openings 3ª are also shown extending therethrough to relieve the bearing frame of excessive weight. The two walls 4 of the housing are shown as being formed on the arc of a circle, and vertical rib members extended from each side of the end walls to the base member 1.

A rectangular bearing plate 5 is supported inside of the housing bearing in base 1 and is retained in position by lugs 6 which have projecting portions extending thereover at each end of the housing. The space between the end walls of the housing from which the lugs 6 project is sufficient to permit the insertion of the plate 5 under the said lugs. Disposed within the housing and supported by the plate 5 is a bearing roller 7. This roller is suitably cored to eliminate excessive weight and is also provided with a central bore. A pin or bolt member 8 passes through the openings 3 of the housing and through the central bore of the roller 7 and projects at either side of said housing. Swingingly mounted upon the projecting ends of the member 8 at each side of the housing are the counterweight members 9, and the member 8 is formed with a head at one end thereof, and at its other end, is provided with any suitable retaining member 10 screwed or riveted thereon to retain the members 9 in proper position. At the top of the side members of the housing are elongated projections, the lower edges of which are formed as rack teeth 11. Above the pin 8, the counter-weight members 9 are formed with a projecting portion comprising a gear segment having radially projecting teeth 12 adapted to engage with the rack teeth 11 on the sides of the housing. It will be noted that by providing the rack teeth on the housing above the pin 8, the counterweight members 9 can be brought into close proximity to the sides of the housing.

In operation, the bearing normally occupies the position shown in Fig. 1. Upon relative movement of the bearing surface engaging the roller member, as when a car is going around a curve, the roller will be turned to traverse in one direction or the other upon its bearing plates. This motion will be transmitted to the counterweight members by the pin 8. These members cannot move longitudinally owing to the segment of the gear teeth thereon with the rack teeth on the housing, and hence, will be swung upon the pin 8 and the counterweight at the lower portion thereof will be elevated. This counterweight portion will tend to descend by gravity and when the bearing surfaces assume the normal position, the roller will be assisted in returning to its central and normal position. The roller will, of course, move longitudinally in the housing and the pin 8 will travel in the elongated slot 3. The plate 5 will be held from tipping at one end when the roller moves to the other end thereof by means of the lugs 6.

It has heretofore been proposed to construct a side bearing having counterweights carried on a pin extending through the bearing roller, which counterweights had gear teeth thereon engaging teeth on the housing below said pin, as shown in the patent to Posson, 1,411,222, granted March 28, 1922, and applicant is making no claim to such a structure. The present invention has been made to overcome certain disadvantages in such a structure, which disadvantages developed in actual service, and constitutes an improvement over such structure. The applicant is the chief engineer of the Standard Car Truck Company of Chicago, Illinois, who is the licensee under the Posson patent. With such a structure, as shown in said patent, when wear occurs on the counterweight due to its swinging on the pin, the same assumes a lower position which causes the gear teeth thereon to move further into the rack teeth on the housing, causing a binding of the teeth. In the present structure, when such wear occurs, the teeth are slightly separated and move with greater freedom. In applicant's structure also the counterweight members can be brought in much closer to the sides of the housing, thereby affording a structure of much less width. In such a structure, as above noted, and which is shown particularly in the patent to Posson, there must be considerable room between the main body of the counterweights and the side of the housing for the gear teeth and rack. When the teeth are placed above the pin it is unnecessary to dispose the counterweights to leave such a space. A flange is usually used at the top of the housing and in applicant's device the gear teeth strengthen this flange. It is also thus unnecessary to place extra metal on the exterior of the side walls of the housing in which to form the rack teeth. Such extra metal adds objectionably to the weight of the housing. Applicant's structure therefore results in a much lighter structure of housing than the construction shown in the Posson patent and yet produces a housing of greater strength. Another advantage of applicant's structure is that the gear and rack teeth are at all times visible and the rack teeth being placed over the gear teeth protect the same and there is no tendency for dirt to collect between the rack teeth to interfere with the proper operation of the gear teeth thereon. Applicant, by disposing the gear teeth above the pin, has produced a much simpler structure of counterweight. Such counterweight is of substantially one thickness, except at the tooth portion at the upper end of the same and the counterweight has substantially flat sides. The gear teeth can thus be conveniently placed on the thinner portion of the counterweight and extend entirely through the same, and such teeth can be cast or finished with a minimum of difficulty. Where the teeth are placed below the pin the spaces between the teeth are blind recesses and it is a difficult task both to cast such a counterweight and to finish the teeth on the same, when such finishing is necessary. It is apparent that applicant's structure is much simpler and more efficient than the structure having the gear teeth below the pin.

It will thus be seen that applicant has provided an improved side bearing of compact design and which has no objectionable projecting parts. The various elements of the device can be readily made of rugged construction and easily assembled. When once assembled, the bearing will require very little attention. It will, of course, be understood that various changes may be made in the form, size and details of the device without departing from the scope of applicant's invention, which, generally stated, consists in the matter shown and described and set forth in the appended claims.

What is claimed is:

1. A side bearing for railway cars having in combination, a frame member comprising a housing, said housing having means adjacent its top for engagement by a counterweight, a bearing roller disposed in said housing, a counterweight swingingly supported at the outer side of said housing closely adjacent the side thereof, said counterweight member having means at its upper end adapted to engage the said means on the housing, and means connecting the roller and counterweight for moving said counterweight to cause the same to swing out of position when said roller moves from normal position, whereby said counterweight will return the roller to normal position.

2. A side bearing for railway cars having in combination, a frame member comprising a housing having substantially parallel side walls, one of said walls having a portion on its outer side adjacent its upper edge having depending gear teeth formed thereon, a bearing roller disposed and movable in said housing, means carried by said roller and projecting therefrom, a counterweight swingingly supported on said last mentioned means and having gear teeth thereon at its upper side engaging said teeth on said housing whereby when said roller is moved out of normal position, said counterweight member will be moved out of normal position, and will return said roller to normal position.

3. A side bearing having in combination, a housing having side walls with substantially vertical outer sides, a bearing plate in the bottom of said housing, a roller supported on and movable on said plate, a pin passing through said roller and projecting at the outer side of said housing, a counterweight member swingingly mounted on said pin having a flat side disposed closely adjacent the outer side of said housing and having teeth forming a gear segment at its upper end and adjacent said side and said housing having downwardly projecting gear teeth adjacent its upper edge forming a rack which is engaged by the teeth on said counterweight whereby the counterweight will be swung out of normal position when said bearing roller moves out of normal position and will return said roller to normal position.

In testimony whereof I affix my signature in presence of two witnesses.

EDWIN W. WEBB.

Witnesses:
F. L. BARBER,
LEE W. BARBER.